United States Patent [19]

Cook

[11] Patent Number: 5,398,947

[45] Date of Patent: Mar. 21, 1995

[54] SELF-ALIGNING COLLET

[75] Inventor: Warren R. Cook, Jackson, Mich.

[73] Assignee: F & S Tool and Gauge Co., Jackson, Mich.

[21] Appl. No.: 165,200

[22] Filed: Dec. 13, 1993

[51] Int. Cl.⁶ .................................................. B23B 31/20
[52] U.S. Cl. ..................................... 279/46.3; 279/133
[58] Field of Search ........................... 279/43.1–43.9, 279/46.1–46.9, 133

[56] References Cited

U.S. PATENT DOCUMENTS

| | | | |
|---|---|---|---|
| 1,955,642 | 4/1934 | Laughlin | 29/62 |
| 2,214,241 | 9/1940 | Baxendale | 279/46 |
| 2,228,337 | 1/1941 | Balas | 279/46 |
| 2,521,099 | 9/1950 | Sheffer | 279/46 |
| 2,595,828 | 5/1952 | Cox | 279/46 |
| 2,689,740 | 9/1954 | Parigian | 279/46 |
| 2,760,781 | 8/1956 | Mann | 279/43.9 |
| 3,136,561 | 6/1964 | McAuliffe et al. | 279/9 |
| 3,910,476 | 10/1975 | Zajac | 279/46.2 |

FOREIGN PATENT DOCUMENTS

| | | | |
|---|---|---|---|
| 357061405 | 4/1982 | Japan | 279/46.3 |
| 403092203 | 4/1991 | Japan | 279/46.3 |
| 1452606 | 10/1976 | United Kingdom | 279/133 |

*Primary Examiner*—Steven C. Bishop
*Attorney, Agent, or Firm*—Beaman & Beaman

[57] ABSTRACT

A rotatable workpiece holding collet having flexible fingers defining an interior workpiece gripping surface intersecting the collet fingers' free end, the portion of the gripping surface adjacent the collet free end being obliquely disposed to the collet axis of rotation to function as a guide surface permitting workpieces to be inserted into the collet during rotation.

8 Claims, 1 Drawing Sheet

SELF-ALIGNING COLLET

BACKGROUND OF THE INVENTION

1. Field of the Invention

The invention pertains to chucks used with machine tools, commonly known as collets, to hold a rotating workpiece between resilient fingers frictionally forced into a gripping relationship with the workpiece.

2. Description of the Related Art

Collets are commonly used with machine tools wherein the collet is mounted within a rotating spindle and the resilient collet fingers are radially translated between workpiece gripping and workpiece releasing positions by the axial displacement of the collet or the collet operator. The ability of the collet to quickly grasp and release a workpiece, and accurately hold the workpiece during machining makes this type of chuck highly desirable in many machine tool applications.

The collet fingers are radially forced inwardly by a camming action resulting from the engagement of a conical surface defined on the exterior of the collet fingers with a conical bore defined in the rotating machine tool spindle. Axial displacement of the collet relative to the conical spindle surface opens and closes the fingers to provide a frictional grasping of the workpiece. The gripping surface of the collet fingers is shaped complementary to the exterior surface of the workpiece, and collet gripping bores may be cylindrical, triangular, rectangular or polygonal, as necessary to accommodate the particular configuration of the workpiece as shown in U.S. Pat. Nos. 2,521,099 and 3,136,561.

It is known to improve the gripping surface of the bore defined by the collet workpiece gripping surfaces by serrating, etching, or otherwise configuring the workpiece engaging surface as shown in U.S. Pat. Nos. 1,955,642; 2,214,241; 2,228,337 and 2,595,828.

When performing secondary operations on previously machined or formed workpieces, it is often desirable that the workpiece be chucked within a rotating spindle of a machine tool by a collet. In such secondary operations, it is necessary to place the workpiece between the collet fingers from the front of the collet, which is usually the reverse direction of movement with respect to the workpiece and collet during primary machining operations wherein the workpiece stock is usually fed through the rear of the collet for access by the tools.

When placing a workpiece within a collet from the front, as preliminary to performing a secondary operation, relative axial movement between the workpiece and collet is necessary to insert the workpiece between the collet fingers. If the workpiece has a non-circular periphery, such as of a square or hexagonal configuration, which is common, it is necessary that the exterior configuration of the workpiece be properly aligned with the complementary collet bore in order to permit reception of the workpiece between the collet fingers. Accordingly, in past practice, it has been necessary to terminate the machine tool spindle and collet rotation prior to front loading the collet with such a workpiece. After the stationary collet and workpiece are properly related and the workpiece is located between the collet fingers, the collet fingers are closed and the spindle and collet rotation initiated in order to perform the secondary machining operation. Such continual stopping and starting of the machine tool spindle and collet is time consuming, but, previously, no collet configuration has been available which would permit the front loading of non-circular workpieces during collet rotation in order to reduce machining cycle time and machine tool wear.

OBJECTS OF THE INVENTION

It is an object of the invention to provide a collet capable of gripping a non-circular workpiece whereby the collet permits front loading during rotation.

Another object of the invention is to provide a workpiece holding collet capable of accommodating a non-circular workpiece wherein the collet gripping surfaces include workpiece aligning portions permitting the front loading of a non-circular workpiece therein to produce proper orientation between the collet fingers and workpiece during collet rotation.

A further object of the invention is to provide a collet for machine tools which permits front loading of workpieces during collet rotation wherein the collet is economically manufacturable, and is readily accommodated by conventional machine tools spindles.

SUMMARY OF THE INVENTION

A collet in accord with the invention is of the usual tubular configuration having a tubular shank received within the machine tool rotatable spindle, and is attached within the spindle by threads or other holders for concentric rotation with the spindle. The spindle, or the collet operator, includes the usual conical cam surface for engaging with the conical surface defined upon the collet resilient fingers for radially displacing the free ends of the fingers during relative axial displacement of the spindle tapered surface and the collet.

Preferably, the collet utilizes the same number of resilient fingers as the planar surfaces defined upon the workpiece circumference, i.e. a rectangular workpiece collet will have four fingers, a collet accommodating a hexagonal workpiece has six fingers, etc. Each of the fingers includes a planar workpiece gripping surface which, together, define the collet finger bore complementary in configuration to the workpiece circumference, and the radial and circumferential dimension of the finger workpiece gripping surfaces substantially corresponds to those of the workpiece whereby the workpiece will be closely received within the collet finger bore even when the fingers are open.

Each of the collet finger workpiece gripping surfaces is formed with a lead-in surface adjacent the bore open end. Such lead-in surface is obliquely related to the collet axis of rotation at a varying angle, intersects the front end surface defined upon the resilient fingers, and is of such a configuration as to guide the non-circular workpiece exterior form into the collet bore even though the collet may be rotating at a machining speed.

The collet finger lead-in surfaces each have forward and rear ends relative to the direction of collet rotation, and the configuration and angle of obliqueness of the lead-in surface varies between its front and rear ends. Adjacent the front end, the lead-in surface is partially defined by a circular surface portion concentric to the axis of collet rotation, and this lead-in surface configuration continues for approximately one-half the distance between the front and rear ends. The last half of the lead-in surface is substantially parallel to the finger workpiece gripping surface. This configuration of the lead-in surface permits non-circular workpieces to be inserted into an open collet while the collet is rotating at machining speeds.

Preferably, the slots or kerfs separating adjacent collet fingers are of a planar configuration parallel to the finger workpiece holding surface of an associated finger intersecting the lead-in front end surface of the associated finger. This co-planar relationship between a kerf surface and finger workpiece holding surface aids in the accommodation of the workpiece within the rotating collet by eliminating a shoulder which might impact the workpiece during workpiece insertion.

The axial dimension of the lead-in surface is only sufficient to align the workpiece circumference surfaces with the complementary finger workpiece holding surfaces, and the gripping of the workpiece within the collet is solely by the finger workpiece engaging surfaces. Once the workpiece is properly received and positioned within the collet finger bore, the collet fingers close upon the workpiece to frictionally engage the same during the secondary machining operation.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
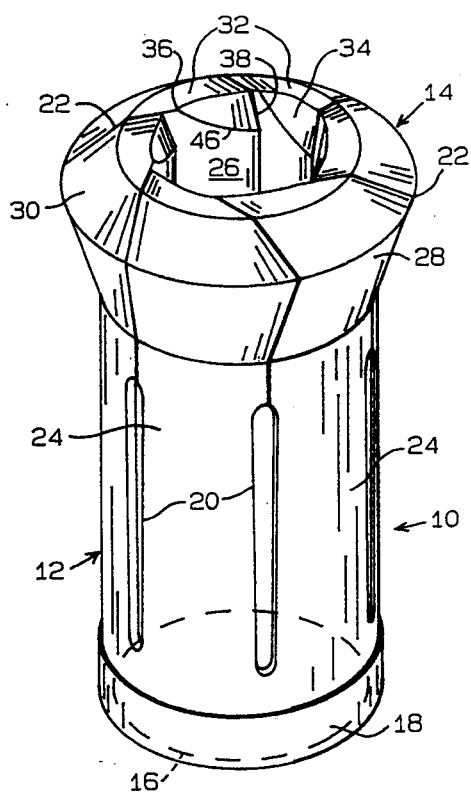
FIG. 1 is a perspective view of a collet utilizing the inventive concepts of the invention.

In FIG. 1, a collet utilizing the inventive concepts is shown in its entirety. The collet includes a tubular shank 12 and an enlarged head 14. Internally, the shank 12 includes a tubular bore 16, and the shank inner end 18 may be internally or externally threaded for cooperation with a machine tool spindle or collet actuator, not shown, as is well known.

A plurality of elongated openings or windows 20 are formed in the wall of the shank 12, and the number of windows 20 usually corresponds to the number of fingers which are defined upon the collet.

The collet head 14 is provided with a plurality of longitudinally extending slits or kerfs 22, a kerf intersecting the outer end of each window 20 as will be appreciated from FIG. 1. Such slitting of the head 14 produces a plurality of longitudinally extending fingers 24, and each of the fingers constitutes a resilient cantilevered element whose outer end is capable of radial flexing with respect to the collet longitudinal axis. Each finger 24 is provided with a workpiece gripping surface 26, and as the disclosed collet is intended for gripping a hexagonal workpiece, six fingers 24 are illustrated and the gripping surfaces 26 are planar, and as will be later described in greater detail, are co-planar with a kerf 22. Additionally, each of the fingers 24, exteriorly, includes a conical shoulder 28 wherein the conical shoulders 28 cooperate with the machine tool spindle, or collet actuator, conical cam surface, not shown, to radially contract the outer end of the fingers, or permit the finger outer ends to radially expand.

The front end of the collet 10 is defined by the conical finger front end surface 30 which may cooperate with collet positioning spindle structure, not shown, and the collet front end surface 32. The planar surfaces 32 are perpendicular to the axis of rotation of the collet 10.

Internally, each of the fingers 24 is provided with a lead-in surface 34 located at the intersection of the workpiece gripping surface 26 and the front end surface 32. The lead-in surfaces 34 are obliquely related to the axis of the collet 10, as later described, and each lead-in surface includes a front end 36 and a rear end 38, such ends being so designated in view of the normal direction of rotation of the collet about its axis of rotation during machining. For instance, with respect to FIGS. 1, 2 and 5, the normal direction of collet rotation during machining is counterclockwise.

Figure 5:
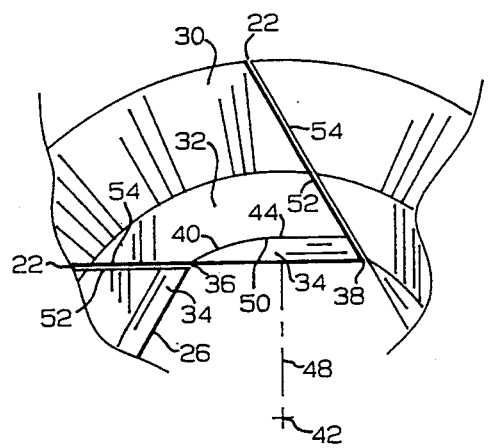
FIG. 5 is an enlarged detail, plan view of a portion of the collect front end as taken along Section 5—5 of FIG. 3.

The lead-in surface 34 includes a curved edge 40 wherein the lead-in surface intersects the surface 32. The curved edge 40, in a plan projection as shown in FIG. 5, constitutes a radius having a center at the collet axis of rotation as represented at 42 in FIG. 5. The curved edge 40 is tangential to the straight edge 44 which extends to the associated lead-in surface rear end 38, FIG. 5, and the edge 44 is parallel to the planar finger gripping surface 26 of the associated finger 24, as will be appreciated from the plan view of FIG. 5.

Figure 3:
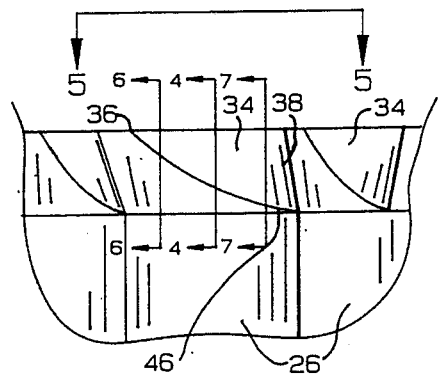
FIG. 3 is an enlarged detail, elevational view illustrating the lead-in surfaces of several fingers as taken along section 3—3 of FIG. 2.

The innermost edge of the lead-in surface 34 is defined by the arcuate edge 46 constituting the intersection between the surface 34 and the associated finger workpiece gripping surface 26, FIG. 3. As will be appreciated from FIG. 3, the edge 46 intersects the edge 40 opposite to the rear lead-in surface 38 of the adjacent finger and rearwardly thereof with respect to the normal direction of collet rotation. Accordingly, the minimal axial dimension of the lead-in surfaces 34 is at the surface front end 36, and the maximum axial dimension is adjacent the surface rear end 38.

Figure 6:
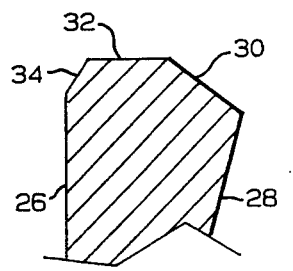
FIG. 6 is an enlarged detail, elevational, sectional view of the outer end of a finger as taken along Section 6—6 of FIG. 3.
Figure 7:
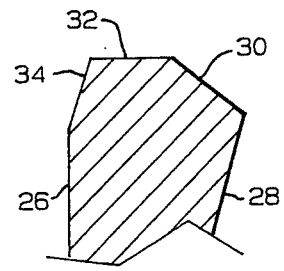
FIG. 7 is a detail sectional view similar to FIG. 6 as taken along Section 7—7 of FIG. 3.
Figure 4:
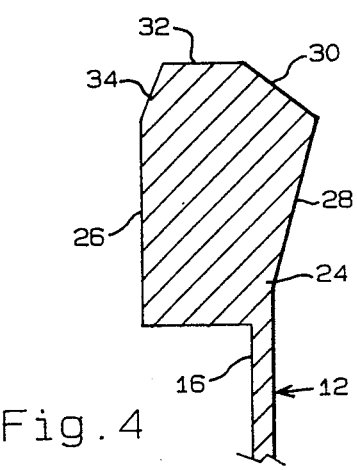
FIG. 4 is an enlarged detail, elevational, sectional view of the outer end of a finger as taken along Section 4—4 of FIG. 3.

The point of intersection of the lead-in surface outer edge 40 and straight edge 44 is indicated at transition point 50. Transition point 50 substantially constitutes an extension of radius 48, FIG. 5, which is perpendicular to the associated finger workpiece gripping surface 26. The aforedescribed location of the lead-in surface edges results in the forward portion of the lead-in surface 34 as being obliquely related to the axis of rotation 42 at a greater angle, while the rear portion of the lead-in surface 34 is obliquely related to the axis 42 at a lesser degree. The change in the extent of obliqueness of the lead-in surface 34 throughout its length is best illustrated by the sections shown in FIGS. 4, 6 and 7. The section of FIG. 6 is taken approximately one-third of the distance of the surface 34 behind the surface front end 36, and at this point the surface 34 is approximately 33° from the axis of collet rotation 42. FIG. 4 illustrates a section approximately one-half the length of surface 34 between ends 36 and 38, and at this location the lead-in surface 34 is approximately 22° obliqueness with respect to the collet axis of rotation. FIG. 7 illustrates a section approximately three-quarters the length of surface 34 behind front end 36, and at this location the surface 34 is approximately 18° with respect to the axis of rotation 42. This difference in angular relationship of the lead-in surfaces 34 throughout their length between ends 36 and 38 aids in the initial entrance of the workpiece into the rotating collet, and sequential alignment of the workpiece circumferential surface with a finger gripping surface 26.

With reference to FIG. 5, the kerf surface intersecting the lead-in surfaces rear end is indicated at 52, and the front kerf surface is represented at 54, this surface being that intersected by the lead-in surface front end 36.

In operation, the collet 10 will be located within the rotating spindle of a conventional machine tool, such as of the multiple or single type, as is well known, not shown. The collet 10 will be associated with the spindle collet actuating surfaces in a manner well known whereby the spindle cam surface will be disposed adjacent the finger conical shoulders 28 such that relative axial movement between the collet and spindle or spindle collet actuating apparatus may occur. The aforedescribed relationship between the collet and spindle and collet operating structure is well known, takes a variety of relationships depending on the make and model of the machine tool, and is not illustrated as it constitutes no part of the instant invention. As mounted in the machine tool spindle, the collet 10 will be rotated in a counterclockwise direction as viewed in FIGS. 1, 2 and 5, and the collet may be rotated at conventional machining velocities, such as between 100 and 250 rpm.

A workpiece upon which a secondary operation is to be performed is held by a conventional workpiece positioner, robot, or the like, capable of axially orienting the workpiece, not shown, to the collet axis of rotation, and holding the workpiece in a rotatable manner. The workpiece is then moved toward the rotating collet 10, and the collet fingers 24 will be in their open relationship, i.e. radially extending outwardly the maximum extent. As the non-otating hexagonal workpiece is axially moved along the collet axis of rotation toward the collet, the "points" or maximum dimension locations of the workpiece as defined by the workpiece planar surfaces, engage the lead-in surface front ends 36 and the workpiece will axially enter the surfaces 34 and the surfaces 34 will align the planar circumferential surfaces of the workpiece with the collet finger gripping surfaces 26. The oblique orientation of the lead-in surfaces 34 will readily align the hexagonal workpiece surfaces with the finger gripping surfaces 26, and the workpiece may be readily axially inserted into the collet 10 to the axial depth desired to permit holding of the workpiece and achieve the secondary machining operation.

The particular configuration of the lead-in surfaces 34 permits the workpiece to be readily inserted into the rotating collet, and as it has not been necessary to stop the rotation of collet 10 the loading cycle for the collet is substantially less than those conventional instances requiring the collet rotation to terminate prior to workpiece loading. Of course, when machining has been completed the collet fingers 14 will be permitted to open, and the workpiece may be removed from the collet finger gripping surfaces 26 in a known manner.

The lead-in surfaces 34 permit the rapid and accurate insertion of a previously non-rotating workpiece into the rotating collet 10 without damage to the workpiece, and the tangential orientation of the kerfs 22 to the gripping surface 26 of an associated finger aids in the insertion of the workpiece into the collet 10 as this angular orientation of the kerf eliminates squared edges or shoulders with respect to the direction of collet rotation which may damage or disfigure the workpiece.

Figure 2:
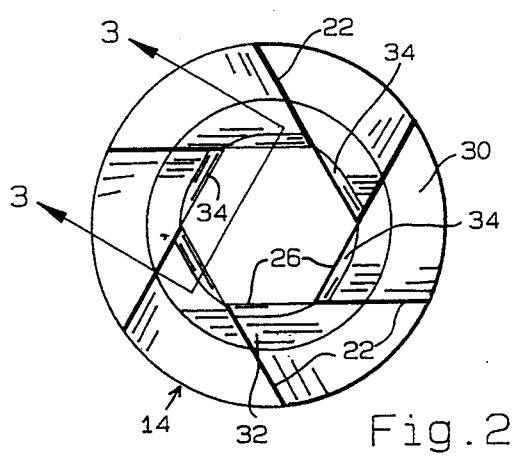
FIG. 2 is a top plan view of the collet of FIG. 1.

In the above description, the configuration of the lead-in surfaces 34, and the angular relationship of the kerfs 22 to the gripping surfaces 26 is based upon the normal direction of rotation of the collet 10 during machining being counterclockwise as viewed in FIGS. 1, 2 and 5. It is to be appreciated that if the machining direction of rotation of collet 10 be clockwise as viewed in FIGS. 1, 2 and 5, the configuration of the lead-in surfaces 34, and kerfs 22 will be reversed. The front ends 36 of the lead-in surfaces 34 must extend in the direction of rotation of the collet during loading, and the kerfs 22 will be related to the surfaces 26 as to eliminate any shoulders existing which may impact the workpiece during workpiece insertion.

It is appreciated that various modifications to the inventive concepts may be apparent to those skilled in the art without departing from the spirit and scope of the invention.

I claim:

1. In a rotatable collet for holding workpieces having planar exterior surfaces of uniform circumferential dimension wherein the collet includes a tubular body having an axis of rotation including a shank having a tubular head including a rear tapered cam surface, a front transverse surface and a gripping bore, the head being defined by a plurality of resilient fingers separated by a kerf and each having a gripping bore defining surface and an outer end, the improvement comprising, an oblique lead-in surface defined on each finger bore defining surface, each lead-in surface having an outer edge intersecting the associated finger outer end and an inner edge axially spaced inwardly from said outer edge, said outer edge being a greater radial distance from the body axis than said inner edge.

2. In a collet as in claim 1, said lead-in surface outer edge being partially concave in configuration.

3. In a collet as in claim 2, said lead-in surface having a forward end and a trailing end with respect to the direction of collet body rotation, the axial dimension of said lead-in surface being minimal at said forward end and at a maximum at said trailing end.

4. In a collet as in claim 3, said inner edge being of a concave configuration with respect to the axial direction toward the body front surface.

5. In a collet as in claim 1, the finger gripping bore defining surfaces being planar and the kerfs being planar in configuration, said lead-in surface having a forward end and a trailing end with respect to the direction of collet body rotation, the plane of said kerfs being co-planar with the plane of the gripping bore surface of an adjacent finger.

6. In a collet as in claim 5, each kerf intersecting said lead-in surface forward end defined upon its co-planar gripping bore surface.

7. In a collet as in claim 6, the axial dimension of each lead-in surface being minimal at said forward end and at a maximum at said trailing end.

8. In a collet as in claim 1, said lead-in surface outer edge including a forward portion constituting a radius having a center coincident with the collet body axis of rotation and a linear rearward portion substantially parallel to the plane of the associated finger gripping bore.

* * * * *